US007359700B2

(12) United States Patent
Swensen et al.

(10) Patent No.: US 7,359,700 B2
(45) Date of Patent: Apr. 15, 2008

(54) PLATFORM-ASSOCIATED VISITOR LOCATION REGISTERS (VLR) FOR CELLULAR COMMUNICATIONS

(75) Inventors: Marvin D. Swensen, Fullerton, CA (US); John G. Himes, Placentia, CA (US)

(73) Assignee: The Boeing Coompany, Chicago, IL (US)

( * ) Notice: Subject to any disclaimer, the term of this patent is extended or adjusted under 35 U.S.C. 154(b) by 223 days.

(21) Appl. No.: 10/888,217

(22) Filed: Jul. 9, 2004

(65) Prior Publication Data

US 2004/0253949 A1    Dec. 16, 2004

Related U.S. Application Data

(63) Continuation-in-part of application No. 10/405,280, filed on Apr. 2, 2003.

(51) Int. Cl.
    *H04Q 7/20*    (2006.01)
(52) U.S. Cl. .................... 455/422.1; 455/12.1
(58) Field of Classification Search ............. 455/418, 455/419, 421, 422.1, 427, 428, 429, 430, 455/431, 433, 435.1, 12.1, 13.1–13.3
    See application file for complete search history.

(56) References Cited

U.S. PATENT DOCUMENTS

| | | | |
|---|---|---|---|
| 3,742,358 A | 6/1973 | Cesaro | |
| 4,476,576 A | 10/1984 | Wheeler et al. | |
| 4,704,732 A | 11/1987 | Csonka | |
| 4,903,036 A | 2/1990 | Wheeler | |
| 5,104,059 A | 4/1992 | Rand et al. | |
| 5,408,515 A | 4/1995 | Bhagat et al. | |
| 5,438,610 A | 8/1995 | Bhagat et al. | |
| 5,651,050 A | 7/1997 | Bhagat et al. | |
| 5,722,042 A | 2/1998 | Kimura et al. | |
| 5,949,766 A | 9/1999 | Ibanez-Meier et al. | |
| 5,963,877 A | 10/1999 | Kobayashi | |
| 5,995,833 A | 11/1999 | Zicker | |
| 6,038,446 A * | 3/2000 | Courtney et al. | 455/428 |
| 6,052,604 A | 4/2000 | Bishop, Jr. et al. | |
| 6,061,562 A | 5/2000 | Martin et al. | |
| 6,104,926 A | 8/2000 | Hogg et al. | |
| 6,151,308 A | 11/2000 | Ibanez-Meier et al. | |

(Continued)

OTHER PUBLICATIONS

Pandiarajan et al., Undedicated HAAP Based Architecture, IEEE Southeastern, pp. 23-36, Apr. 2000.

(Continued)

*Primary Examiner*—Naghmeh Mehrpour
(74) *Attorney, Agent, or Firm*—Gates & Cooper LLP

(57) ABSTRACT

A wireless communications system and method provides wireless communications service for user equipment on board an aircraft. The aircraft includes on-board system equipment for supporting the wireless communications service with on-board user equipment. One or more ground stations are used for communicating with the aircraft using a plurality of feeder links for exchanging the wireless communications service's traffic and control information with the on-board system equipment, and for providing interfaces with a terrestrial telecommunications infrastructure. A mobile switching center manages the ground stations and the on-board system equipment of the aircraft, wherein the mobile switching center includes at least one platform visitor location register (VLR) associated with each aircraft to ensure proper registration and tracking of the user equipment used on board the aircraft.

23 Claims, 13 Drawing Sheets

U.S. PATENT DOCUMENTS

| | | |
|---|---|---|
| 6,167,263 A | 12/2000 | Campbell |
| 6,249,243 B1 | 6/2001 | Takagi |
| 6,249,913 B1 | 6/2001 | Galipeau et al. |
| 6,285,878 B1 | 9/2001 | Lai |
| 6,314,286 B1 | 11/2001 | Zicker |
| 6,321,084 B1 | 11/2001 | Horrer |
| 6,324,398 B1 | 11/2001 | Lanzerotti et al. |
| 6,393,281 B1 | 5/2002 | Capone et al. |
| 6,408,180 B1 | 6/2002 | McKenna et al. |
| 6,580,921 B1 | 6/2003 | Inoue et al. |
| 6,603,967 B1 * | 8/2003 | Sinivaara et al. ............ 455/431 |
| 6,795,699 B1 * | 9/2004 | McCraw et al. ............. 455/408 |
| 2002/0016168 A1 | 2/2002 | Rousseau et al. |
| 2002/0019229 A1 | 2/2002 | Usher et al. |
| 2004/0142658 A1 * | 7/2004 | McKenna et al. .......... 455/11.1 |
| 2004/0147243 A1 * | 7/2004 | McKenna .................... 455/403 |
| 2004/0253951 A1 * | 12/2004 | Chang et al. ................ 455/431 |
| 2006/0040660 A1 | 2/2006 | Cruz et al. |

OTHER PUBLICATIONS

Rudokas, Cellular System Performance Prediction, Radio and Wireless Conference (RAWCON), pp. 15-156, Aug. 1998.

El-Jabu et al., Cellular Communications Using Aerial Platforms, IEEE Transactions on Vehicular Technology, vol. 50, No. 3, pp. 686-700, May 2001.

Rudokas, Capacity Losses in Sector and Microcell Cellular Systems, IEEE Communications Letters, vol. 1, No. 2, Mar. 1997, pp. 43-45.

* cited by examiner

PLATFORM-ASSOCIATED VISITOR LOCATION REGISTERS (VLR) FOR CELLULAR COMMUNICATIONS

CROSS-REFERENCE TO RELATED APPLICATIONS

This application is a continuation-in-part under 35 U.S.C. §120 of and commonly-assigned U.S. Utility patent application Ser. No. 10/405,280, filed Apr. 2, 2003, by Marvin D. Swensen and John G. Himes, entitled "AIRCRAFT BASED CELLULAR SYSTEM,", which application is incorporated by reference herein.

This application is related to the following co-pending and commonly-assigned patent applications:

U.S. Utility patent application Ser. No. 10/888,219, filed on Jul. 9, 2004, by Robert V Hamm, entitled "AVIONIC BASE STATION CONTROLLER (ABSC) FOR AIRCRAFT-BASED CELLULAR COMMUNICATIONS," and U.S. Utility patent application Ser. No. 10/887,798, filed on Jul. 9, 2004, by Ming U. Chang and John G. Himes, entitled "INDUCED CELLULAR COMMUNICATIONS HANDOVER," which application is a continuation-in-part under 35 U.S.C. §120 of co-pending and commonly-assigned U.S. Utility patent application Ser. No. 10/405,280, filed Apr. 2, 2003, by Marvin D. Swensen and John C. Himes, entitled "AIRCRAFT BASED CELLULAR SYSTEM,"

both of which applications are incorporated by reference herein.

BACKGROUND OF THE INVENTION

1. Field of the Invention

The present invention relates to wireless communications systems, and particularly to wireless communications systems using aircraft.

2. Description of the Related Art

In the United States and elsewhere, domestic cellular telephony coverage is not universally available. Estimates suggest that coverage by terrestrial cellular systems using analog (first generation or 1G) technology now extends to 70% of the co-terminus United States land mass and 95% of the population. Likewise, coverage by terrestrial systems using digital (second generation or 2G/2.5G) technology extends to only 20% of the co-terminus United States land mass but includes 80% of the population.

Within those geographical areas already covered by terrestrial cellular service, vagaries of electromagnetic propagation cause gaps in service with estimates indicating that these gaps are as extensive as 10% to 20% of nominal coverage. As it requires a significant investment, further expansion of the existing terrestrial cellular infrastructure to accommodate the population not presently served is unlikely.

Furthermore, when deployed in terrestrial cellular systems, anticipated third generation (3G) technology will likely cover a co-terminus United States land mass no larger than its immediate 2G/2.5G predecessor. Some authors refer to these shortfalls in terrestrial cellular coverage as the cellular divide or, for generations 2G and beyond, the digital divide.

Prior inventors have brought forth a variety of approaches for providing coverage of mobile telephony users in areas not presently served. Most well known are low earth-orbiting (LEO) satellite-based systems such as IRIDIUM™ and GLOBALSTAR™. These systems rely on a constellation of LEO satellites to provide coverage for properly equipped users. The users communicate directly with a satellite, which uses feeder links to relay user traffic to a ground station, or ground stations, for connection with the terrestrial telecommunications infrastructure. Low earth orbiting satellites necessarily provide global or near-global coverage so that the associated investment yields an overall capacity, which greatly exceeds the capacity available for domestic (US) usage at any time.

Also presently in service are several geosynchronous (GEO) satellite-based systems, e.g. MSV™, THURAYA™ and ACES™. These systems place a dedicated satellite (or satellites) above the geographic region to be covered so that their entire capacity is available to properly equipped users therein. Users again communicate directly with the satellite, which relays traffic to a ground station using feeder links.

For either LEO or GEO satellite-based systems, some user equipment also operates with selected terrestrial cellular systems. However, not all user equipment supports dual mode operation, e.g., MSV™ offers only dedicated single mode user equipment.

Alternate satellite-based systems are also possible. For example, U.S. Pat. No. 5,722,042, which is incorporated by reference herein, advocates a satellite communications system with a double-layered earth-orbiting constellation with a lower first orbit altitude and a higher second orbit altitude. None of these alternate systems appears to have entered service.

Regardless of their orbital characteristics, satellite-based systems opt to impose a fixed set of cells on the earth's surface. This approach forces non-stationary satellites to adjust their antennas to track a coverage area as they move along their orbits and to rapidly switch their antennas between coverage areas periodically to support a new coverage area on the earth's surface. Supporting such fixed patterns simplifies user operation but complicates antenna design and increases satellite cost.

High costs associated with rocket launches make satellite-based systems very expensive to deploy. Moreover, high usage costs and bulky, expensive user terminals limit adoption of deployed satellite-based systems by potential subscribers. Several of these systems have gone through bankruptcy whereas others only recently entered service with financial results still indeterminate.

Other systems for providing coverage of domestic mobile telephony users in unserved areas include a variety of elevated platforms, including an interesting dual use of National Weather Service balloons.

U.S. Pat. No. 3,742,358, which is incorporated by reference herein, and other patents cited therein illustrate the distant origins of knowledge of extensive coverage associated with elevated platforms, e.g., airborne platforms. Subsequently, U.S. Pat. Nos. 4,704,732 and 5,104,059, which are both incorporated by reference herein, identify communications as one application of freely suspended, long endurance high altitude platforms. U.S. Pat. Nos. 4,476,576 and 4,903,036, which are both incorporated by reference herein, employ a tethered aerostat specifically as an antenna to support VLF communications.

U.S. Pat. Nos. 5,949,766 and 6,151,308, which are both incorporated by reference herein, describe ground devices and an elevated wireless communications hub capable of switching, i.e., separating signals from multiple sources and sending them to multiple destinations. U.S. Pat. No. 5,963,877, which is incorporated by reference herein, extends this concept to high altitude platforms that employ antennas capable of creating a cell structure on the earth's surface to support wireless communications including cellular telephony. U.S. Pat. No. 6,061,562, which is incorporated by reference herein, further extends this concept to include a dedicated aircraft flying above the service region while U.S. Pat. No. 6,167,263, also incorporated by reference herein, uses a plurality of dedicated aerial platforms or vehicles, capable of communicating with each other, to provide a global communications network. Finally, U.S. Pat. No. 6,324,398, which is incorporated by reference herein, explicitly emulates the terrestrial cellular infrastructure with ground-based switching centers supporting base stations located on a plurality of dedicated airborne platforms.

All of the foregoing systems strive to keep their elevated platforms stationary over a fixed geographic area to support a fixed service area or set of fixed service areas. In line with this objective, powered elevated platforms rely on tracking antennas much like low earth orbiting satellites but they do not utilize handover of coverage areas as these satellites do.

At present, none of these systems related to elevated, but non-orbiting, platforms has entered operational service. As revenue that they generate must cover all operating costs, nationwide deployment of a cellular-type system comprising dedicated elevated platforms appears unlikely. As intended applications, systems based on elevated platforms most often describe either supplemental cellular coverage in regions with heavily utilized terrestrial cellular infrastructures or prime coverage in heavily populated areas with limited or no terrestrial cellular infrastructure. They do not discuss sparsely populated regions because operation therein does not admit recovery of said platform's operating costs.

Commercial aircraft offer another set of elevated platforms that can provide wireless communications to remote terrestrial users. Since these platforms are airborne and, hence, positioned to offer wireless communications services, for the primary purpose of transporting passengers or freight, wireless communications services must defray only a minor part of an commercial aircraft's operating cost. In addition, commercial aircraft pass over remote areas even though they fly between population centers. With more than 1500 commercial aircraft simultaneously airborne for more than sixteen hours daily, domestic coverage provided by this fleet is extensive.

A few years ago, many commercial airlines began offering airborne (on-board) telephone services by implementing telephone units at specific locations within the cabin of the commercial aircraft, typically placed in seatbacks. This service used UHF frequency bands to link outbound calls (from passengers) to ground stations but, due to high usage costs, never achieved financial success. Such services invariably do not support inbound calls because ground-based callers encounter prohibitive difficulties in identifying a ground station within transmission range of a particular aircraft. Because of disappointing financial results, some airlines are now removing this equipment to avoid the cost associated with transporting its weight.

Several subsequent inventions address shortcomings of airborne telephone services. For example, U.S. Pat. No. 5,651,050, which is incorporated by reference herein, describes a method for directing calls of terrestrial origin to an on-board telephone or telephones without knowing aircraft location. The on-board telephones are dedicated to the aircraft but may be temporarily assigned to passengers using traveler identification numbers.

U.S. Pat. No. 6,052,604, which is incorporated by reference herein, extends this calling method to allow passengers to use their own subscriber identity module (SIM) cards as identifiers while sharing on-board telephone resources. This method invokes the system security associated with SIM cards without requiring dedicated telephone units for each passenger who wishes to avail themselves of outbound and/or incoming calling services.

Although Global System for Mobile Communications (GSM) communications equipment employs SIM cards, neither TDMA nor CDMA equipment do. Re-use of passenger equipment offers a powerful incentive to adoption of airborne telephony service, however. Thus, U.S. Pat. No. 6,249,913, which is incorporated by reference herein, describes a method to use passengers' personal terrestrial cellular telephones with docking cradles that disable on-the-air transmissions from these units within the aircraft. Contrariwise, U.S. Pat. No. 6,249,243, which is incorporated by reference herein, describes a method for using low power, on-the-air transmissions to and from passengers' personal cellular telephones within the aircraft.

U.S. Pat. No. 6,393,281, which is incorporated by reference herein, describes a means for seamless handoff of calls as an aircraft passes out of the coverage area of one ground station and into the coverage area of another ground station.

Although focused on providing broadband services to passengers, U.S. Pat. No. 6,285,878, which is incorporated by reference herein, initially recognized the feasibility of extending these airborne services beyond passengers to include terrestrial users located within line-of-sight of the host aircraft. The method described in this patent is more restrictive than that described herein because it relies on crosslinks between commercial aircraft and requires control over aircraft scheduling to ensure availability of platforms for relaying communications traffic.

In addition, crosslink equipment is expensive especially as it requires pointing and supports multiple levels of relay, i.e., communications traffic from multiple aircraft. Airlines set their schedules based on attracting passengers within constraints imposed by their specific gate assignments at particular airports, which may not readily support long strings of aircraft relaying communications traffic as, for instance, those crossing the North Atlantic Ocean.

Although others have observed that commercial aircraft and cellular telephony make a potent combination, none have addressed coverage gaps that inevitably develop in terrestrial cellular patterns hosted by commercial aircraft. See e.g., V. Pandiarajan and L. Joiner, "Undedicated HAAP Based Architecture for Cellular Data Transfers," IEEE Southeastcon, pp. 23-26, 2000, which is incorporated by reference herein. As these aircraft choose their own schedules and flight dynamics while operating in an environment that sometimes disrupts both schedules and/or flight dynamics, using commercial aircraft to offer cost-effective wireless communications services requires techniques described in the present invention.

SUMMARY OF THE INVENTION

A wireless communications system and method provides wireless communications service for user equipment on board an aircraft. The aircraft includes on-board system equipment for supporting the wireless communications service with on-board user equipment. One or more ground stations are used for communicating with the aircraft using a plurality of feeder links for exchanging the wireless communications service's traffic and control information with the on-board system equipment, and for providing interfaces with a terrestrial telecommunications infrastructure. A mobile switching center manages the ground stations and the on-board system equipment of the aircraft, wherein the mobile switching center includes at least one platform visitor location register (VLR) associated with each aircraft to ensure proper registration and tracking of the user equipment used on board the aircraft for managing communication routing to and from the user equipment.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
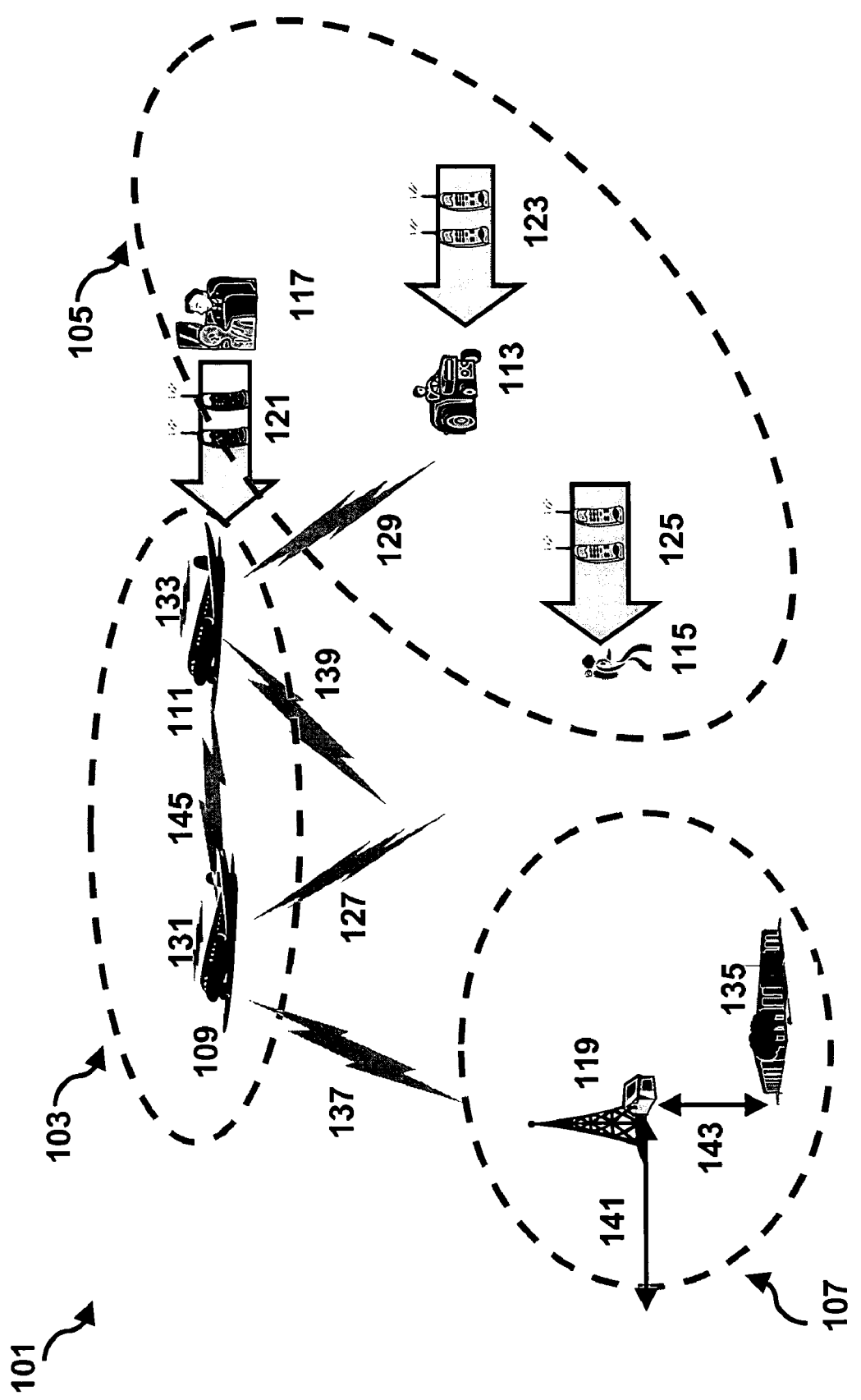
FIG. 1 is a block diagram showing the principal components of a preferred embodiment of the system of the present invention.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

1. Overview

There are typically over 3000 commercial aircraft operating over the United States during normal daily operating hours. Operating at altitudes above 30,000 feet, these aircraft have a field of view to earth of over 200 miles, and as a result, these aircraft offer an excellent platform for wireless communications towers that can provide digital wireless communications coverage over most of the United States. In addition, aircraft equipped with wireless communications capability can also provide digital wireless communications services (such as cellular telephony) to onboard passengers.

The system architecture of the present invention utilizes aircraft equipped with base stations that operate as wireless communications towers which form a cellular structure that migrate with the aircraft. Therefore, the cellular frequency re-use pattern "moves" with the aircraft. All aircraft equipped with wireless communications will provide digital communications for the onboard passengers. The onboard wireless communications are routed to the terrestrial telecommunications infrastructure (may be existing) through wireless communication links established with ground stations for backhaul communications. Some of the equipped aircraft are designated to provide service to terrestrial users and are assigned a cellular frequency that migrates with the aircraft. As these aircraft traverse above terrestrial users, the aircraft acts as a base station for the terrestrial user, routing the terrestrial users communications through the aircraft base station to the ground station for backhaul communications.

Those aircraft assigned cellular frequencies form a floating cellular frequency structure that repeats over and over again as selected aircraft are assigned cellular frequencies. The cellular structure not only repeats linearly along the flight path of the selected aircraft but also perpendicularly to these flight paths. This is done to minimize the number of frequencies used and thus maximize the frequency re-use.

By maximizing frequency re-use, a greater number of terrestrial users may be served within an allocated frequency band. In order to optimize frequency re-use, a ground-based control center coordinates the allocation of cellular frequencies assigned to the selected equipped aircraft. The control center ensures that the aircraft assigned a given cellular frequency does not interfere with the cellular frequency assigned to a neighboring aircraft for purposes of servicing terrestrial users.

The control center ensures proper assignments of the moving cellular structure and reassignments of the cellular frequencies from an existing assigned aircraft to another equipped aircraft as may be necessary to ensure the integrity of cellular structure as the aircraft traverse their respective flight path. The system will provide service to user with terminals that are equipped with appropriate functionality to operate with the wireless base stations aboard the equipped aircraft. Users on the ground with terminals implemented with this capability can obtain digital wireless communications services within those landmass areas presently underserved. Aircraft passengers with these terminals can obtain digital wireless communications during flight onboard aircraft equipped with base stations. It is envisioned that these user terminals would also offer standard wireless communications via existing cellular communications infrastructures.

The system architectural approach utilizing current wireless technology described herein offers an economical means of providing digital wireless communications coverage in the range of 90 to 95% of domestic landmass that encompasses a population in the range of 98 to 99%.

2. Exemplary Embodiments

A typical embodiment of the invention includes an implementation based on commercial passenger aircraft, a nationwide grid of ground stations, centralized system control, dual mode user equipment, and a frequency allocation distinct from the standard terrestrial cellular frequency bands. It is recognized that the principles of the present invention apply with other air vehicles or a mix of aircraft and other air vehicles, with distributed system control, with regional ground station grids, with user equipment that supports more than two modes of operation, and with multiple (more than one) frequency allocations distinct from the standard terrestrial cellular bands.

FIG. 1 provides a block diagram for the commercial aircraft-based system 101 comprising three segments (aircraft 103, user 105 and control 107) and the interfaces between these segments. The exemplary system uses commercial aircraft 109, 111 to provide wireless communications for terrestrial users 113, 115 within aircraft field of view and collaterally for on-board users 117 (e.g., passengers). The plurality of domestic commercial aircraft airborne at most times provides extensive geographic coverage including areas currently without service or underserved by terrestrial cellular systems. Thus, these commercial aircraft serve a dual use and are not dedicated only to operation of the system 101.

The aircraft segment 103 includes commercial aircraft 109, 111 serving as base stations with on-board equipment capable of supporting wireless communications with properly equipped users 113, 115, 117 and of exchanging traffic and control information with ground stations 119 using feeder communications links. This segment need not include all domestic commercial aircraft, but to provide extensive domestic coverage more aircraft than any single domestic airline currently operates should be employed.

The user segment 105 comprises subscribers (terrestrial 115, 113 or on-board 117) and equipment (dual mode handsets 121, 123, 125 and ancillary equipment such as docking stations, chargers and batteries). User equipment 121, 123, 125 can communicate with aircraft on-board equipment using cellular-type wireless communications either external 127, 129 or internal 131, 133 to the aircraft. Dual mode user equipment 121, 123, 125 can also communicate with standard terrestrial-based cellular service wherever available except on-board a host aircraft in flight where techniques such as low level jamming or capture of the wireless communications initiation can be used to preclude use of terrestrial-based cellular service. This service specifically addresses individuals lacking cellular service as potential users. Current cellular subscribers and frequent flyers also present promising candidates.

The control segment 107 includes a grid of one or more ground stations 119 spread across the entire system coverage area (similar to terrestrial cellular base stations) and a control center 135. Ground stations 119 communicate directly with commercial aircraft 109, 111 using feeder links 137, 139 to exchange traffic and control information and also to provide backhaul interfaces 141 with the terrestrial telecommunications infrastructure. Collocation of ground stations 119 with existing cellular sites is not mandatory but does offer a ready-made terrestrial infrastructure as these sites experience identical connectivity requirements.

The control center 135 monitors all ground stations 119 and commercial aircraft 109, 111 serving as base stations and assigns resources to them. These assignments are dynamic to accommodate aircraft movement and changes in aircraft schedules, so this control center must periodically convey assignments to aircraft.

Interfaces between the segments include cellular-type links 127, 129 between users and aircraft and feeder links 137, 139 between aircraft and ground stations. To avoid interference, neither of these inter-segment interfaces uses terrestrial cellular operating frequencies. Within segments, terrestrial interfaces 143 exist between ground stations 119 and the control center 135. In further embodiments, crosslinks 145 between aircraft can be used as a natural extension of the present invention.

Figure 2:
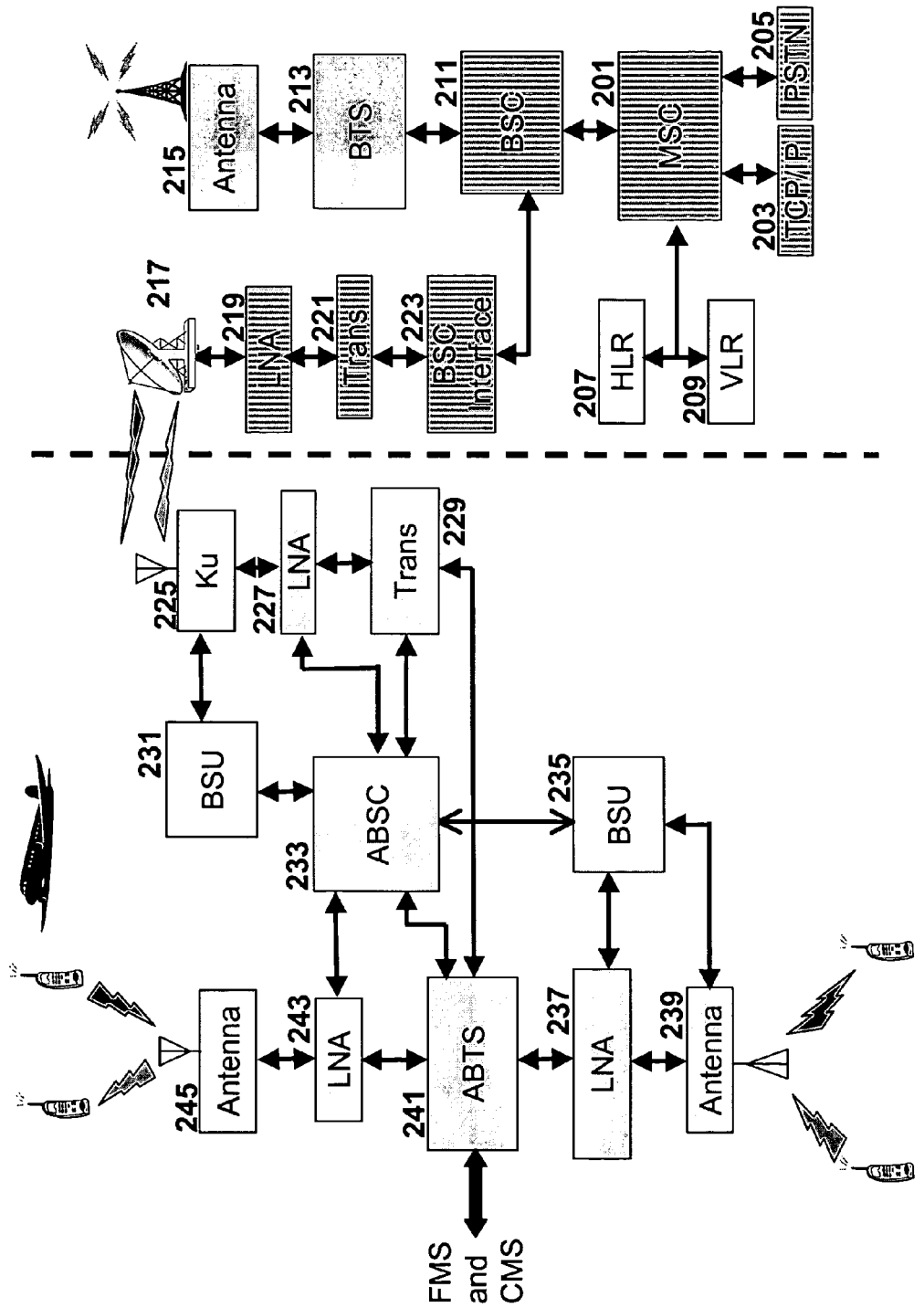
FIG. 2 is a block diagram illustrating the components used in an embodiment of the present invention.

FIG. 2 is a block diagram illustrating the components used in an embodiment of the present invention. The ground equipment includes a Mobile Switching Center (MSC) 201, that may be coupled, via a gateway, to a TCP/IP network 203 (such as the Internet), Public Switched Telephone Network (PTSN) 205, or other network. The MSC 201 includes at least one Home Location Register (HLR) 207 that identifies local customers and at least one Visitor Location Register (VLR) 209 that identifies roaming customers.

The MSC 201 is also coupled to a Base Station Controller (BSC) 211, which is coupled to a Base Transceiver Station (BTS) 213, which is coupled to a cell tower antenna 215 in order to communicate with ground-based user equipment. In addition, the BSC 211 is coupled to a ground station 217 by means of a Low Noise Amplifier (LNA)/Diplexer 219, Transceiver (Trans) 221, and a BSC Interface Unit 223, respectively, in order to communicate with the aircraft.

The ground station 217 communicates with a Ku-band antenna 225 affixed to the aircraft. The antenna 225 is coupled via an LNA 227, Transceiver 229 and Beam Steering Units (BSU) 231 to an Avionic Base Station Controller (ABSC) 233 on board the aircraft, wherein the ABSC 233 comprises certified avionic equipment that allows terrestrial-type Base Station Controller (BSC) functions to effect cellular communications on board the aircraft.

The ABSC 233 is coupled to one or more Beam Steering Units (BSU) 235 and an LNA 237 to one or more antennae 239 in order to provide terrestrial-type BSC communications functions on the aircraft for ground-based user equipment. The ABSC 233 is also coupled to at least one Avionic Base Transceiver Station (ABTS) 241 and LNA 243 to one or more cabin antennae 245, in order to provide communications functions on the aircraft for onboard passengers. However, a terrestrial-type BSC 211 cannot be used as the ABSC 233, and customized software and hardware for communications routing, control, system built-in self test, aircraft power and environmental conditions, are required. Also coupled to the ABTS 241 is a Flight Management System (FMS) and a Communications Management System (CMS).

The ABSC 233 aggregates and manages communications between the ABTS 241 and the ground-based MSC 201. Ground (uplink) signals are relayed to the ABTS 241 for transmission to cabin-based user equipment or ground-based user equipment. Aircraft (downlink) signals are relayed from the ABTS 241 from cabin-based user equipment, or ground-based user equipment, for transmission to the ground base station 217. Aircraft data (such as latitude, longitude, tail number, etc.) provided by the FMS and CMS is also used. Ground base station 217 location information is received and sent to the BSU 231 for antenna 225 steering. Also received is built-in test diagnostic data from the various components. In certain embodiments of the present invention, the ABSC 233 may be eliminated with the ABST 241 communications with MSC 201 aggregated and managed through the terrestrial BSC 223. Likewise, the BSU 231 may be eliminated in certain embodiments if an omni-directional Ku antenna 225 is employed.

To be fully accepted by users, cellular communications offered on board a high-speed aircraft must be transparent to the user, relative to his or her normal cellular services. The cellular communications offered on board a high-speed aircraft, therefore, must offer the ability to send and receive cellular calls, receive voice mail and pages, etc. This requires that the user equipment be logically associated with the aircraft for the purposes of routing communications to and from the user equipment as it travels with the aircraft.

Normally, the user equipment operates within a "home area," and, as such, the attributes of the services available to the user equipment are stored in the HLR 207 of a home MSC 201 where the user equipment typically operates. However, when the user equipment is operated in a "foreign area" outside its home area, the attributes of cellular services available for use by the user equipment are stored in the VLR 209 of a foreign MSC 201, which exchanges information with the HLR 209 of the home MSC 201.

Previously, HLRs 207 and VLRs 209 have been defined by fixed physical geographic boundaries that are used to determine the physical location of the user equipment as well as the service provisions available to the user equipment. However, user equipment operated on board an aircraft could conceivably be in view of an HRL 207 and/or multiple VLRs 209. If the user equipment is viewed by multiple HRLs 207 and VLRs 209, the system may log the user equipment into more than one HLR 207 or VLR 209, and create problems in routing calls to the intended user.

The present invention avoids this problem by locating the ABSC 233 or ABTS 241 on board the aircraft. Because the ABSC 233 and/or ABTS 241 travels with the aircraft, the assigned cellular frequencies that service the on board user equipment also move with the aircraft.

Nonetheless, when the user equipment is used on board the aircraft, it must be accounted for within a VLR 209 and it must be associated with just one VLR 209. The aircraft, on the other hand, as it traverses its flight path, switches its feeder links from one terrestrial ground station 217 to the next with great regularity and accomplishes this in a "make-before-break" manner to ensure continuity of ongoing calls on board the aircraft. The terrestrial ground stations 217 used for feeder links also service multiple aircraft.

To ensure proper registration and tracking of user equipment used on board an aircraft, a logical "Platform VLR" 209 associated with each aircraft is defined at the terrestrial MSC 201. These logical Platform VLRs 209 contain the appropriate information for each user equipment active on the aircraft at any time during the flight. This eliminates the need for switching or re-registering the user equipment with other VLRs 209. It also ensures having correct and timely knowledge of the location of all user equipment used or activated during a flight, in order to solve the problems of routing calls to and from user equipment on board the aircraft and providing a consistent means of locating the user equipment on board the aircraft for routing communications to/from the user equipment.

Thus, the Platform VLR 209 is not associated with a fixed geographical area, but is associated with the aircraft or other mobile platform. The attributes of all user equipment when operated on board the aircraft reside in the Platform VLR 209. Whenever the cellular user equipment is operated on board the aircraft, it will be noted as associated with the Platform VLR 209. This facilitates the routing of incoming calls to the user equipment on board the aircraft, in addition to providing consistent outgoing cellular communications services. This approach eliminates the need to constantly determine the geographic location of the user equipment operating on board the aircraft.

Figure 3:
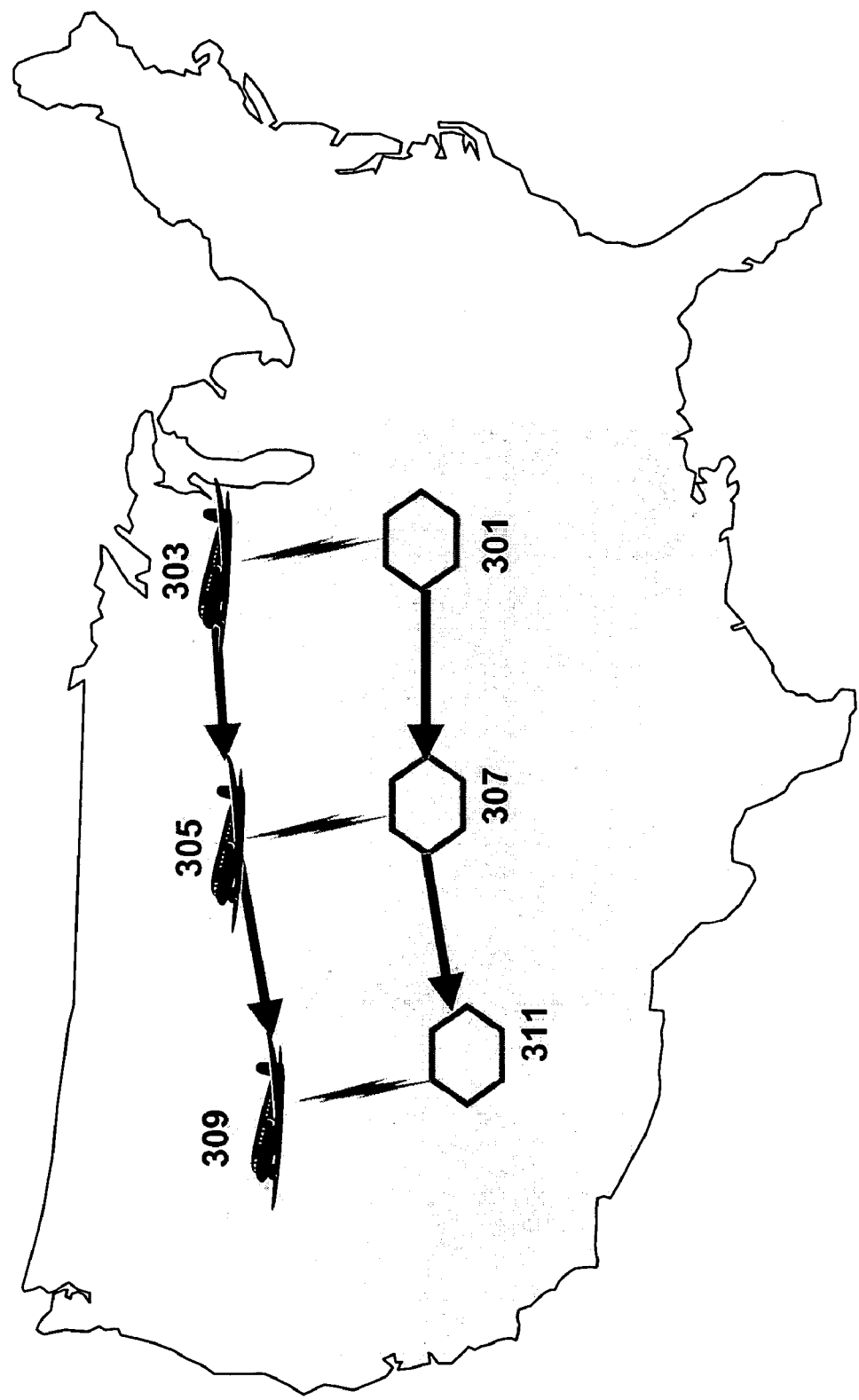
FIG. 3 shows a ground coverage cell for serving terrestrial users as it moves along with its host aircraft during flight.

FIG. 3 shows an exemplary individual coverage cell 301 on the continental U.S. supported by a host aircraft 303 at a particular time. One key to simple aircraft antennas and inexpensive aircraft installations is a cellular pattern comprising coverage cells that move along with their respective host aircraft. As this aircraft continues in flight, its coverage cell moves along with it. Thus, when this aircraft subsequently arrives at position 305, its coverage cell 307 now occupies a different geographical area. Later in its flight, when this aircraft arrives at position 309, its coverage cell 311 now occupies yet another geographical area. Other host aircraft also support coverage cells, which migrate along with their hosts in the same fashion.

Figure 4:
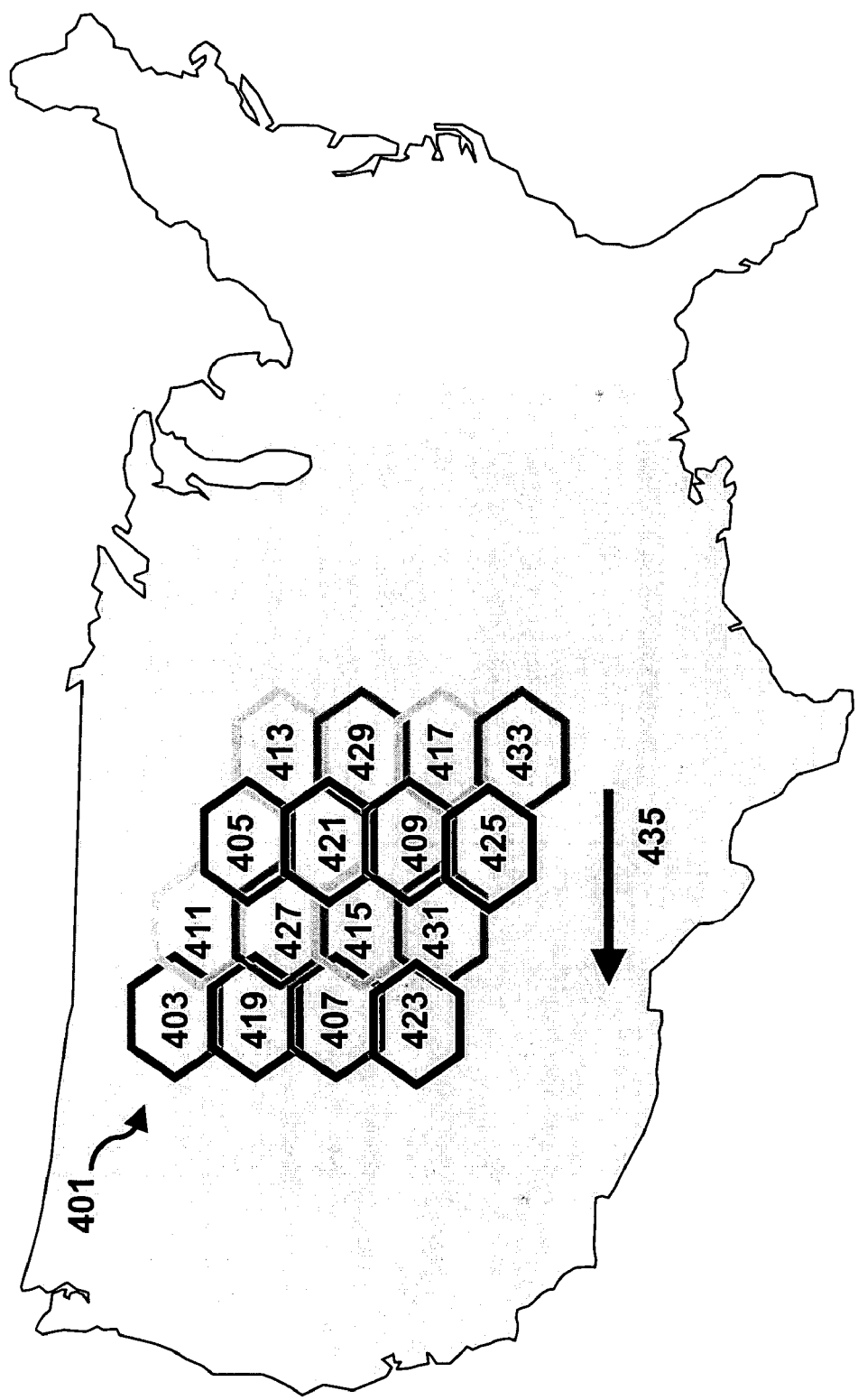
FIG. 4 shows a cellular pattern provided by multiple aircraft where each aircraft supports one coverage cell on the ground.

FIG. 4 shows coverage cells from different host aircraft forming a cellular pattern 401 on the ground. This figure employs a re-use factor of four wherein cells 403, 405, 407 and 409 use a first set of allocated frequencies, cells 411, 413, 415 and 417 use a second set of allocated frequencies, cells 419, 421, 423 and 425 use a third set of allocated frequencies, and cells 427, 429, 431 and 433 use a fourth set of allocated frequencies. Although cellular patterns with a re-use factor of four provide optimal performance for voice applications (e.g., R. Rudokas, "Cellular System Performance Prediction," Radio and Wireless Conference, pp. 153-156, 1998, which is incorporated by reference herein), embodiments of the invention can employ other re-use factors as well.

Coverage cell size is a critical factor in system design. Larger cells require fewer aircraft to provide full domestic coverage, but place more stress on user equipment making these units more expensive. For example, commercial aircraft operating at approximately a 30,000 foot altitude enjoy a line of sight exceeding 200 miles so many choices of cell size are possible. See e.g., B. El-Jabu and R. Steele, "Cellular Communications Using Aerial Platforms," IEEE Transactions on Vehicular Technology, pp. 686-700, May 2001, which is incorporated by reference herein. One embodiment of the present invention compromises by selecting approximately 43 miles as a coverage cell radius. For hexagonal placement of coverage cells, maximum inter-cell overlap is approximately 11.6 miles. Thus, approximately 74.4 miles separates adjacent cell centers in each direction. Each cell covers approximately 5809 ($\pi \times 432$) $mi^2$ of which about 17% is lost to overlaps, yielding an effective coverage area of 4821 $mi^2$ per cell. So, approximately 568 cells of this size can provide complete U.S. domestic coverage.

As each coverage cell moves along the ground with its assigned aircraft, a specified aircraft may keep its allocated frequencies, i.e., its cell intact from point of origin to destination although it may not support ground-based traffic at all times. Providing allocations to aircraft is an important task executed by the control segment, which must ensure that these cells maintain coverage without interfering with one another.

It should also be noted that as the aircraft moves along and performs maneuvers, e.g., banking, the coverage pattern, the cell locations and size, will modulate. However, adequate margin in the coverage pattern will accommodate this coverage modulation. In addition, the modulation format can have an effect on the optimal coverage pattern. For example, time division multiple access (TDMA) will restrict the allowable cell size as a consequence of the moving cell antenna affixed to the aircraft.

Commercial aircraft have different points of origin and different destinations so coverage cells hosted by different aircraft do not necessarily support a highly structured cellular pattern as familiar from terrestrial cellular systems. Instead they exhibit cellular patterns with dynamic variation especially for aircraft traveling in different directions. As indicated in FIG. 4, if all participating aircraft travel in the same direction 435 (westbound as shown), then the resulting cellular pattern holds its shape for more than the few minutes sufficient to alter a pattern that relies on counter-directional aircraft.

Consequently, to mitigate effects of aircraft schedules and dynamics on cellular re-use patterns, the present invention can separate aircraft into four groups corresponding to their primary directions of travel. Directions selected do not need to correspond to the cardinal directions (northbound, eastbound, southbound and westbound). Employing separate cellular patterns for each group minimizes significant differences in aircraft ground velocity due to the jet stream and their direction of travel thus enabling formation of more stable cellular patterns. Deployment of this system does not require all four of these patterns; even a single directional pattern can provide service. However, coverage improves with each directional pattern added.

Figure 5:
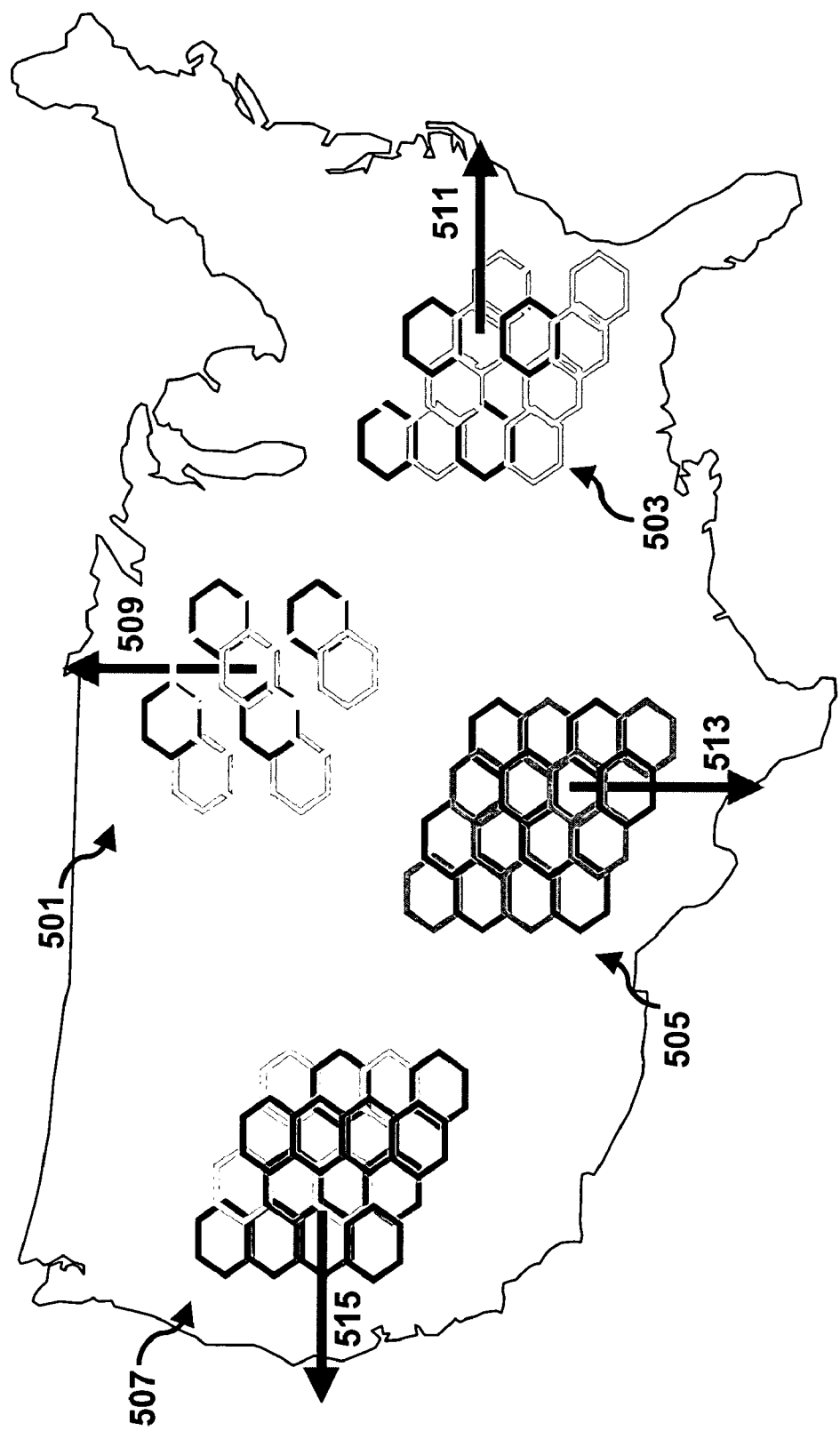
FIG. 5 shows the structure of overlapping northbound, eastbound, southbound and westbound cellular patterns.

FIG. 5 shows a frequency allocation split into four cellular patterns 501, 503, 505, 507 assigned to northbound 509, eastbound 511, southbound 513 and westbound 515 aircraft flows, respectively. As illustrated in FIG. 5, each of these four directional cellular patterns employs a re-use factor of four internally. Other choices of re-use factor are possible and cell patterns assigned to different directions of travel may also choose to employ different re-use factors.

Figure 6:
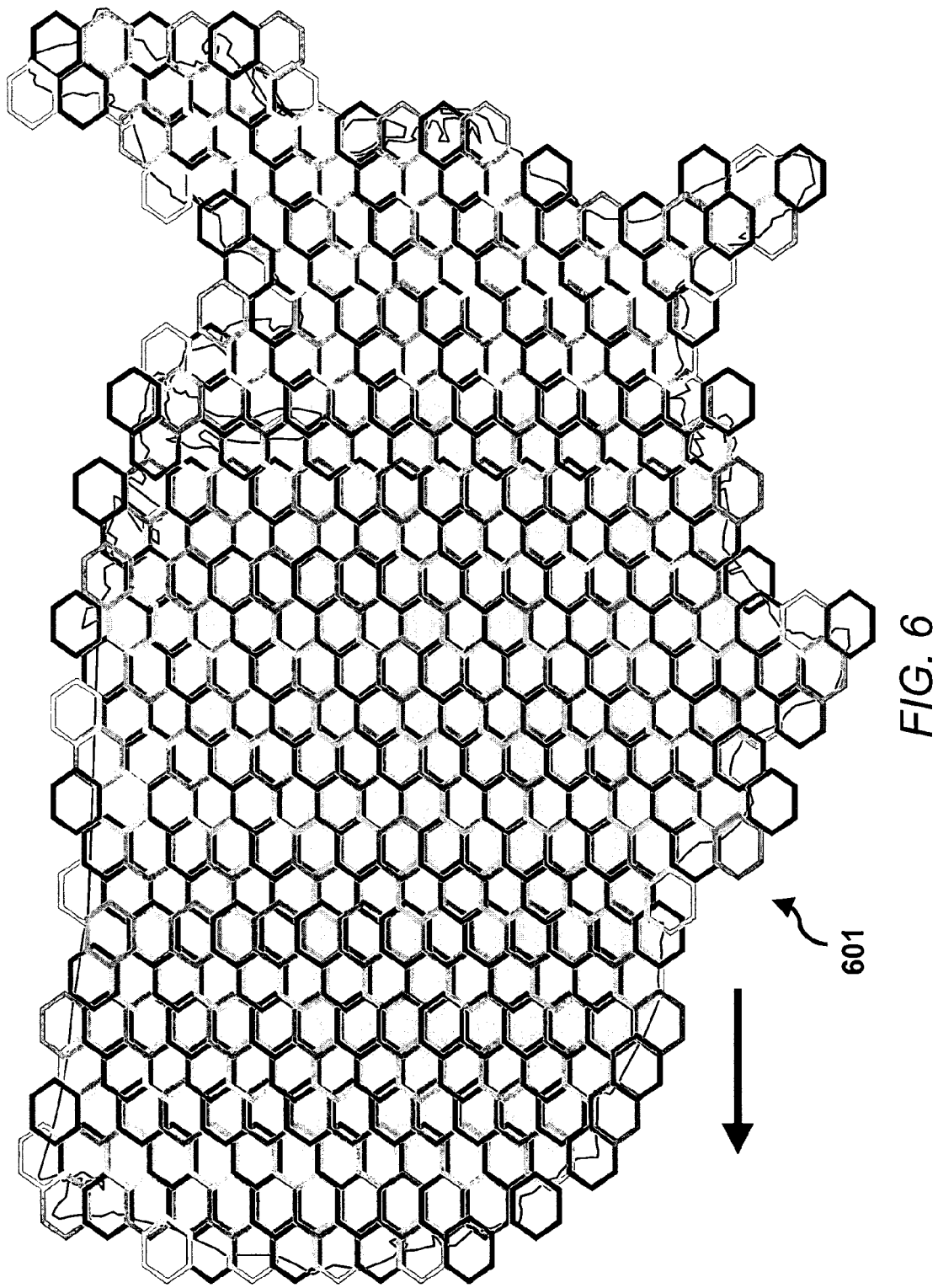
FIG. 6 shows an aircraft-based directional cellular pattern providing domestic coverage.

FIG. 6 shows that as the number of aircraft in flight permits, each directional cellular pattern provides nationwide coverage for the westbound cellular pattern 601. Aircraft movement and schedules cause temporary gaps in coverage in any of these directional cellular patterns. Use of overlapping directional patterns reduces the incidence of coverage gaps and decreases their durations. See e.g., R. Rudokas, "Capacity Losses in Sector and Microcell Cellular Systems," IEEE Communications Letters, pp. 43-45, March 1997, which is incorporated by reference herein.

A typical commercial aircraft is airborne between 9 and 12 hours daily so approximately 1515 (568×(24/9)) equipped aircraft are necessary to provide complete domestic coverage with one cellular pattern around the clock. Allowing a factor of ⅓ for mismatched schedules and aircraft maintenance increases this quantity (1515) to 2020 equipped aircraft out of more than 7000 aircraft in the commercial fleet. For coverage in two or more directions, this number increases although schedule mismatch becomes less important when overlapping coverage is available.

Enough aircraft are in flight to provide nationwide domestic coverage for about 16 hours daily. In most regions, performance is limited between the hours of 1 AM and 5 AM local time when demand is also low. This coincides with usage of terrestrial cellular systems, which experience peak (busy hour) demand for about 4 hours daily but less than 10% of this level for nearly 10 hours daily.

Although directional cellular patterns overlap, transmissions from cells in the companion cellular patterns have no more impact on performance experienced by users in a cell than transmissions from adjacent cells in the same cellular pattern. Thus, deploying overlapping cellular patterns based on direction of travel does not degrade achievable performance.

Figure 7:
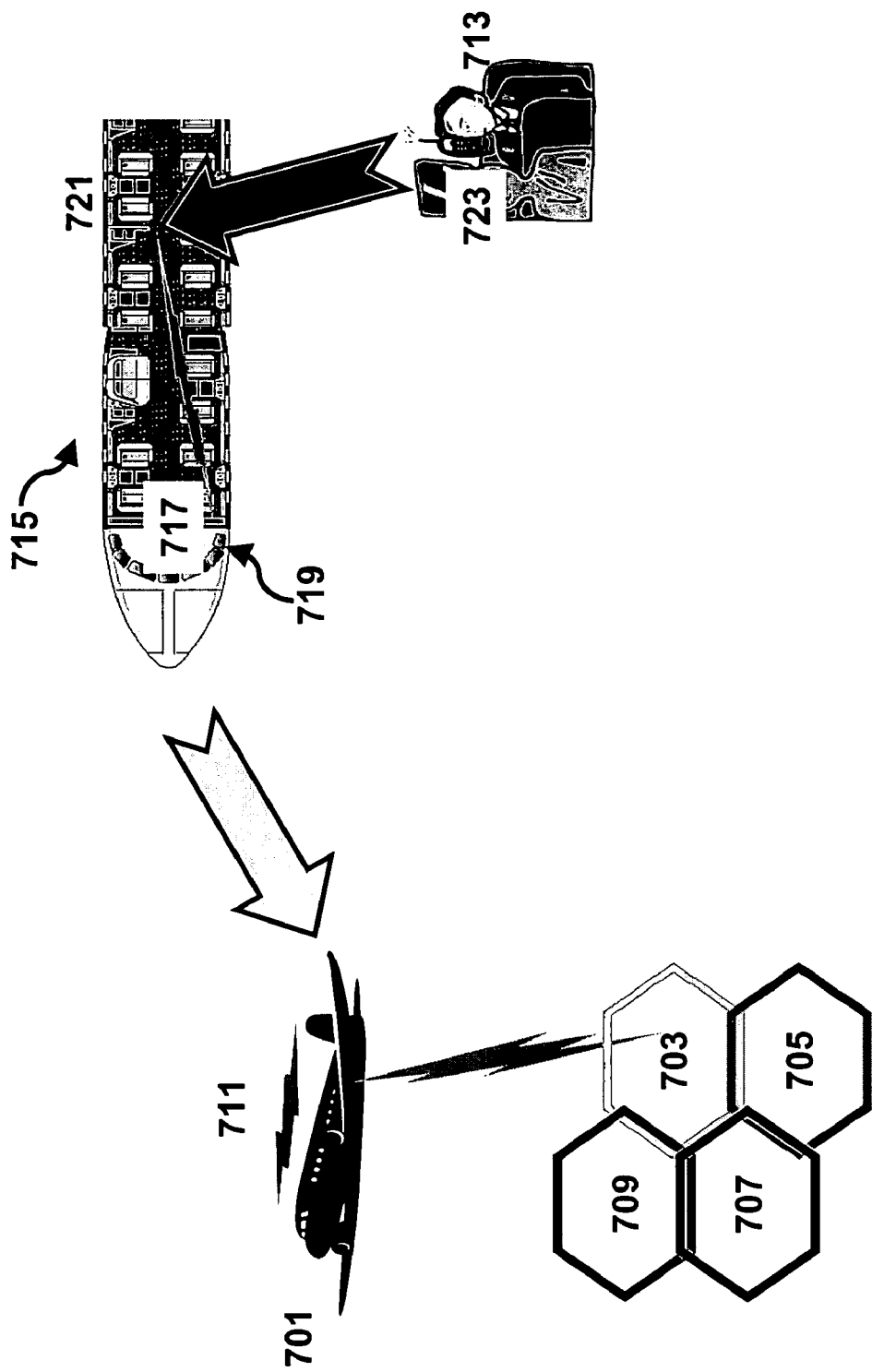
FIG. 7 shows re-use of neighboring or adjacent frequency allocations within an aircraft for passenger services.

FIG. 7 shows re-use of neighboring or adjacent frequency allocations within an aircraft for passenger services. Embodiments of the invention can additionally provide wireless communications for passengers on-board an aircraft having identical user equipment as that which supports terrestrial-based users. As previously described, an exemplary aircraft 701 supports its own external coverage cell 703. As shown in FIG. 7, the aircraft 701 also employs some or all of the frequency allocations assigned to neighboring and overlapping cells 705, 707 and 709 to provide wireless coverage 711 for passengers 713 at low signal levels. This approach avoids mutual interference between this internal on-board usage and external usage in either direction.

Within the aircraft cabin 715 shown from a top view, antennas 717 mounted internal to the cabin link on-board base station equipment 719 with passenger locations 721, enabling passengers 713 to communicate by employing their user equipment 723. As an example, in the coverage depiction of FIG. 7, the frequency allocation from cell 705 is reused in the aircraft cabin. Some commercial aircraft may deploy multiple internal antennas to ensure coverage for all passenger locations.

In further embodiments, aircraft can utilize various techniques such as low level jamming of terrestrial cellular uplink bands or capture of cellular communications initiation to preclude passengers from using their standard (terrestrial-only) cellular user equipment as airline personnel cannot monitor this usage.

Figure 8:
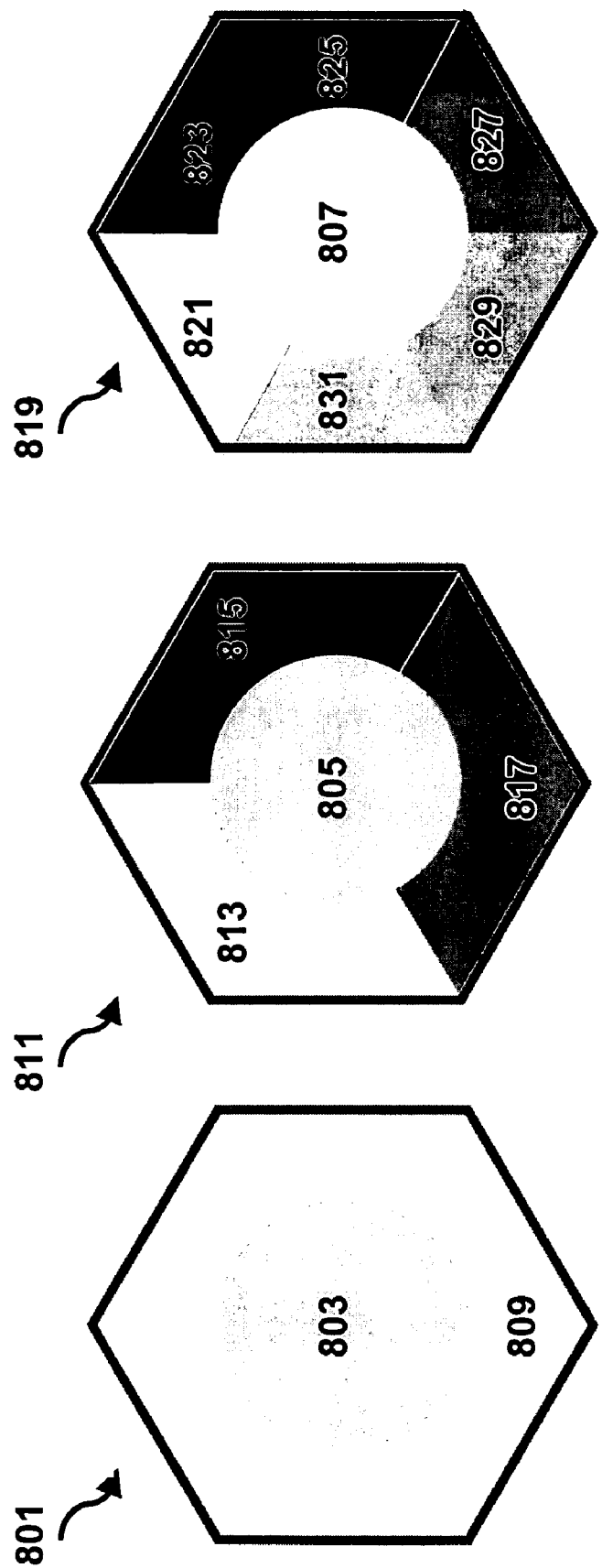
FIG. 8 shows sectorization of each coverage cell into multiple parts including multiple embodiments that use two, four or seven sectors, respectively.

FIG. 8 shows several sectorizations which differ from typical terrestrial sectorization through inclusion of a central sector of circular shape. Sectorization of ground coverage cells provided by commercial aircraft divides the frequency allocation given to a coverage cell among the sectors formed therein. This technique can reduce co-channel interference in the cellular patterns supported by these aircraft. As shown in FIG. 8, for aircraft-based cells 801, several sectorizations are shown which differ from typical terrestrial sectorization through inclusion of a central sector of circular shape 803, 805, 807. Sectorization may divide the annular region into as many sectors as desired and with non-uniform shapes.

The simplest first configuration 801 employs only two sectors to facilitate employment of standard cellular technology by limiting sector size and, hence, user delay times. Despite its shape and overall extent, the surrounding sector 809 also imposes tighter limits on user delay times. The second configuration 811 uses a central sector 805 and three equal area annular sectors 813, 815 and 817 to reduce co-channel interference by approximately 3 dB. The third configuration 819 uses a central sector 807 and six equal area annular sectors 821, 823, 825, 827, 829 and 831 to reduce co-channel interference by approximately 6 dB.

Figure 9:
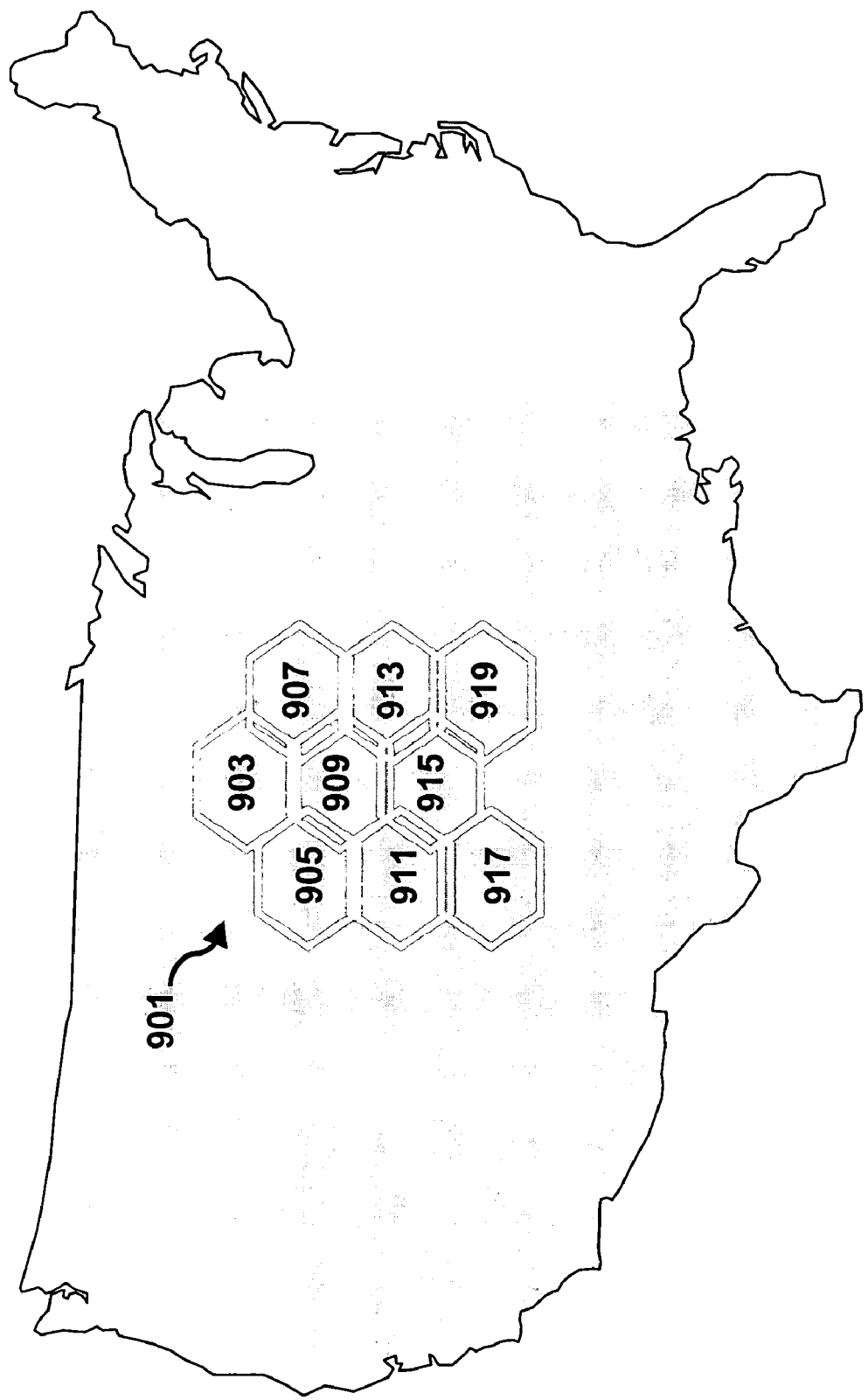
FIG. 9 shows the cellular pattern structure for ground station feeder links between aircraft and ground stations.

FIG. 9 shows the nationwide grid of ground stations 901 that support an exemplary system also set up a cellular pattern to re-use the feeder link frequency allocation. Each feeder link cell 903, 905, 907, 909, 911, 913, 915, 917 and 919 utilizes the entire feeder spectrum allocation. To avoid interference while keeping aircraft antennas and installations simple and inexpensive, each ground station uses high gain antennas to track aircraft while exchanging relatively broadband feeder signals. Tracking antennas minimize interference enough to support a re-use factor of one for the feeder link frequency allocation thereby maximizing system capacity. With an ample frequency allocation, this grid may employ other re-use factors with attendant simplification of equipment.

Cells associated with ground stations enjoy fixed locations so that careful siting of equipment to minimize intercell interference or to maximize cell coverage is possible. These cells may employ dimensions similar to those employed with moving aircraft-based coverage cells, especially when available frequency allocation for feeder links is limited, but ground station cells and aircraft-based coverage cells are independent from one another. As long as ground stations provide support for each participating aircraft, no relationship needs to exist between their cells and aircraft-based cells.

Regardless of cell dimensions, cells associated with ground stations do not occupy aircraft coverage cells per se;

instead the latter cells sweep past fixed ground station cells as individual aircraft come and go. With as many as four overlapping directional cellular patterns, each ground station supports at least four aircraft simultaneously.

Figure 10:
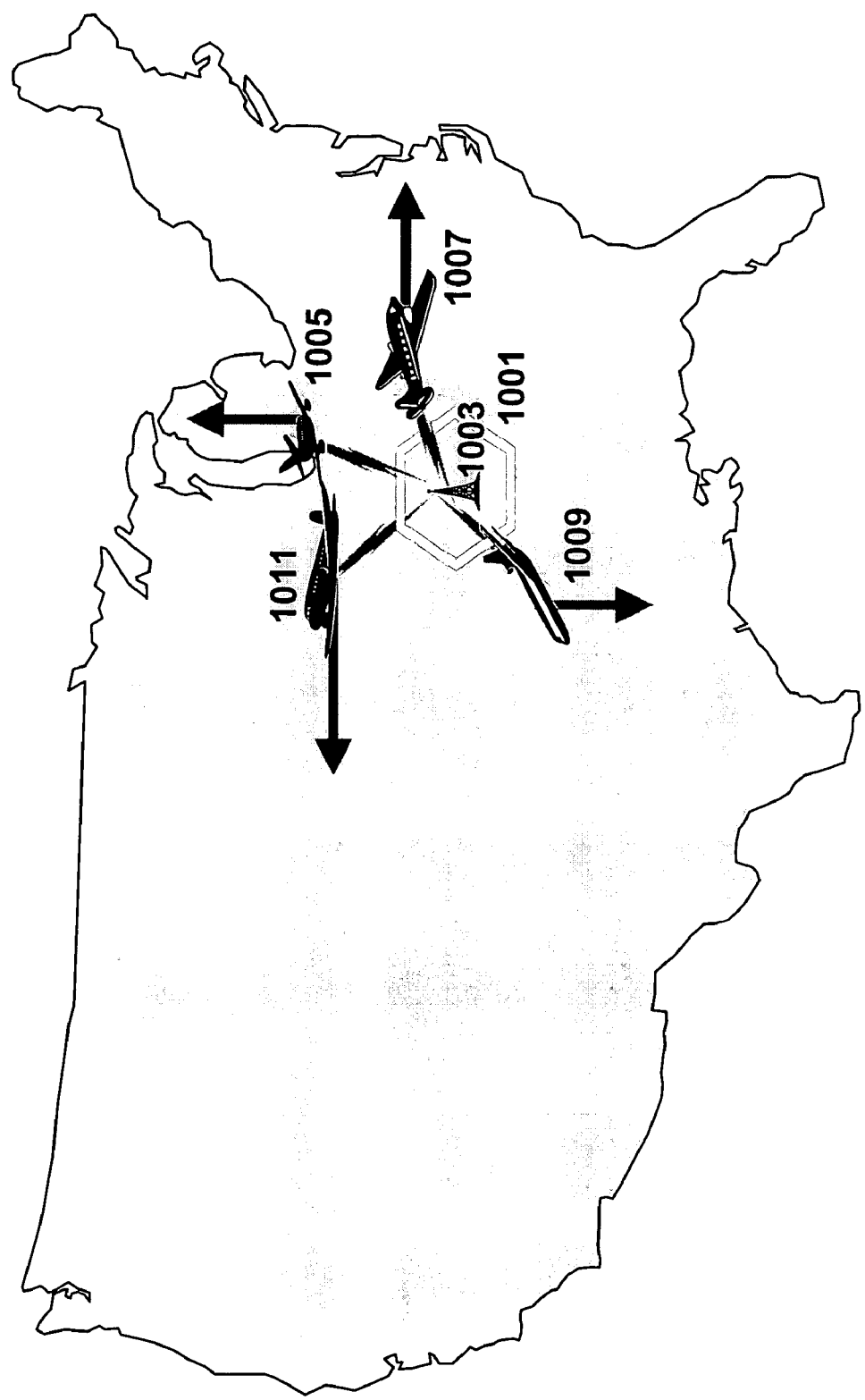
FIG. 10 shows a ground station with feeder links serving four aircraft comprising one aircraft from each of the four aircraft-based directional cellular patterns.

FIG. 10 illustrates support of multiple directional cellular patterns. To support four directional cellular patterns, each ground station cell 1001 has sufficient resources 1003 to support northbound 1005, eastbound 1007, southbound 1009 and westbound 1011 aircraft. As any of these aircraft may cross paths as seen from this ground station, when reporting to the same ground station aircraft traveling in different directions share this feeder link frequency allocation, e.g., each aircraft takes one-quarter of it.

Figure 11:
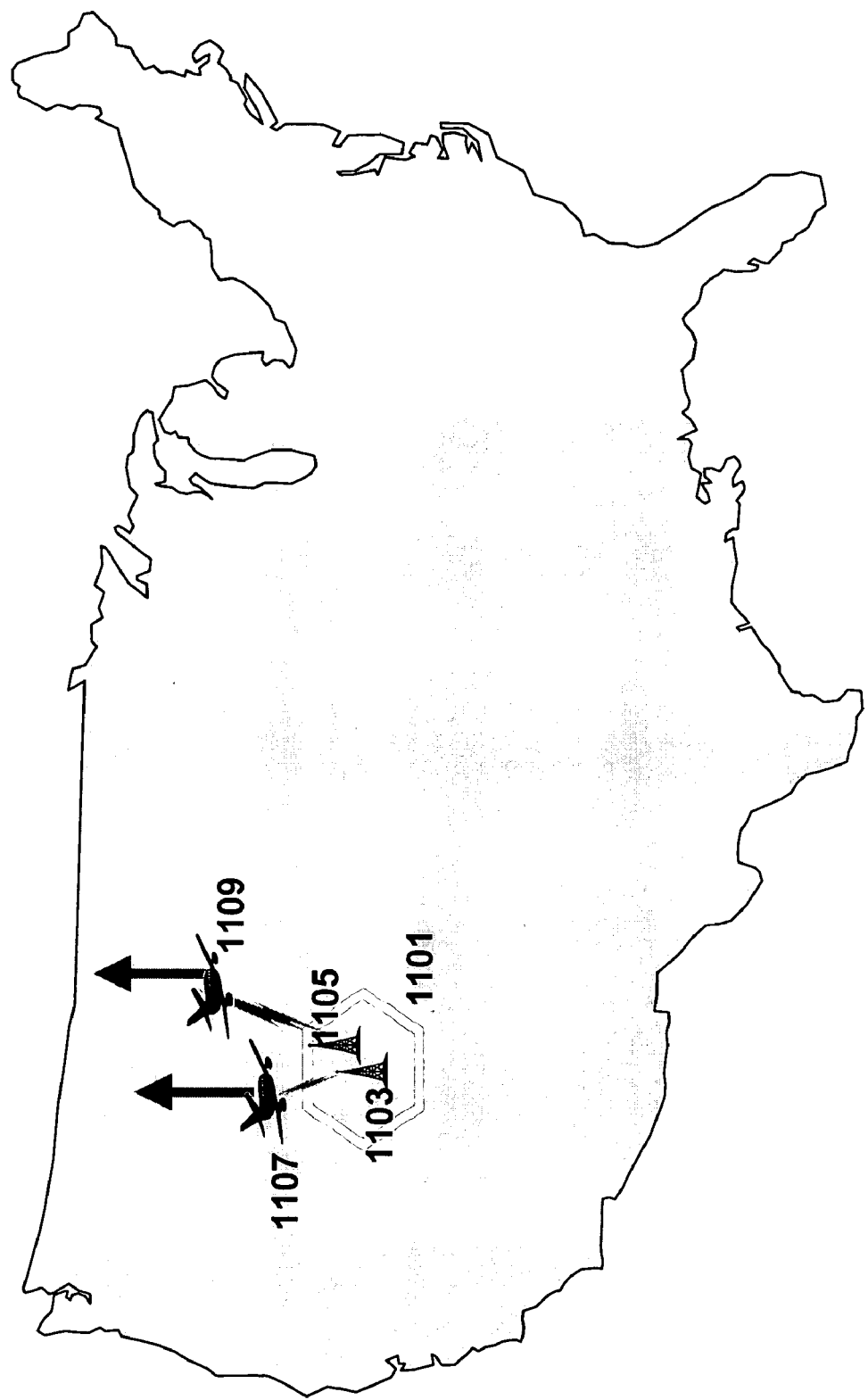
FIG. 11 shows a ground station with feeder links serving two aircraft that share an allocation thereby providing a joint coverage cell.

FIG. 11 illustrates use of high gain tracking antennas at a ground station also allows for partial re-use of any of the four directional frequency allocations within a ground station's coverage area 1101. This segmentation requires more equipment 1103, 1105 at a ground station, but also provides additional capacity by recovering passenger-originated traffic from both aircraft. Thus, multiple (co-directional) aircraft 1107, 1109 can operate within this coverage area provided they share (in any partition from 0%/100% to 100%/0%) the frequency allocation intended for aircraft-based cellular communications. The control center adjusts the overall cellular pattern for this direction to accommodate any distortion in coverage attributable to this resource sharing.

Figure 12:
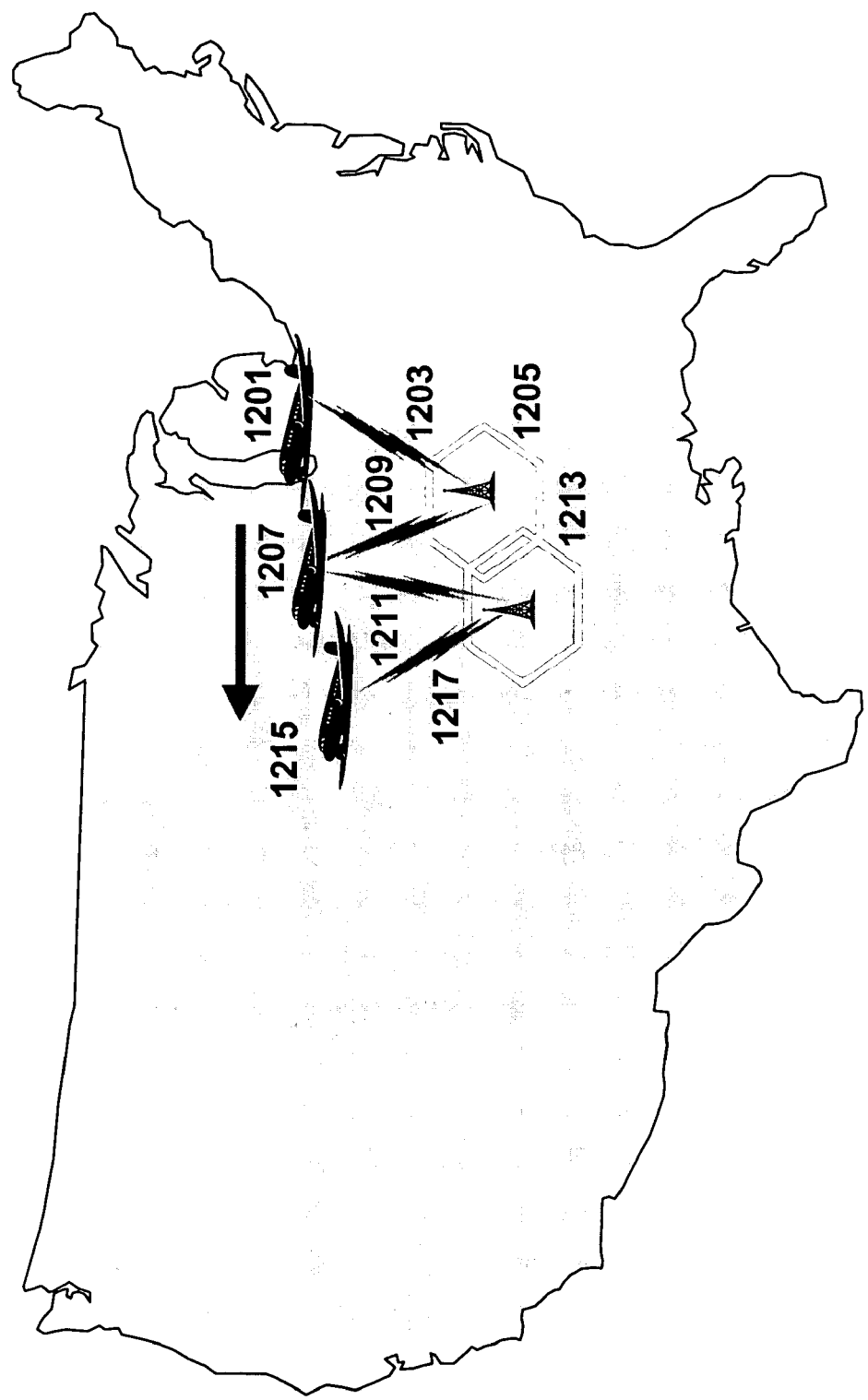
FIG. 12 shows an aircraft switching its feeder link between two ground stations.

FIG. 12 illustrates handover traffic and control information from one ground station to another to maintain connectivity for users as individual aircraft fly along. An aircraft 1201 uses feeder link 1203 to communicate with ground station 1205. As this aircraft reaches position 1207 and begins to exit the coverage provided by ground station 1205, it continues to communicate with this ground station 1205 using feeder link 1209 but also simultaneously establishes a feeder link 1211 with ground station 1213. With feeder link 1211 operational, the aircraft 1207 switches traffic to feeder link 1211 and discontinues feeder link 1209. As the aircraft reaches position 1215, it relies entirely on feeder link 1217 to communicate with ground station 1213.

Figure 13:
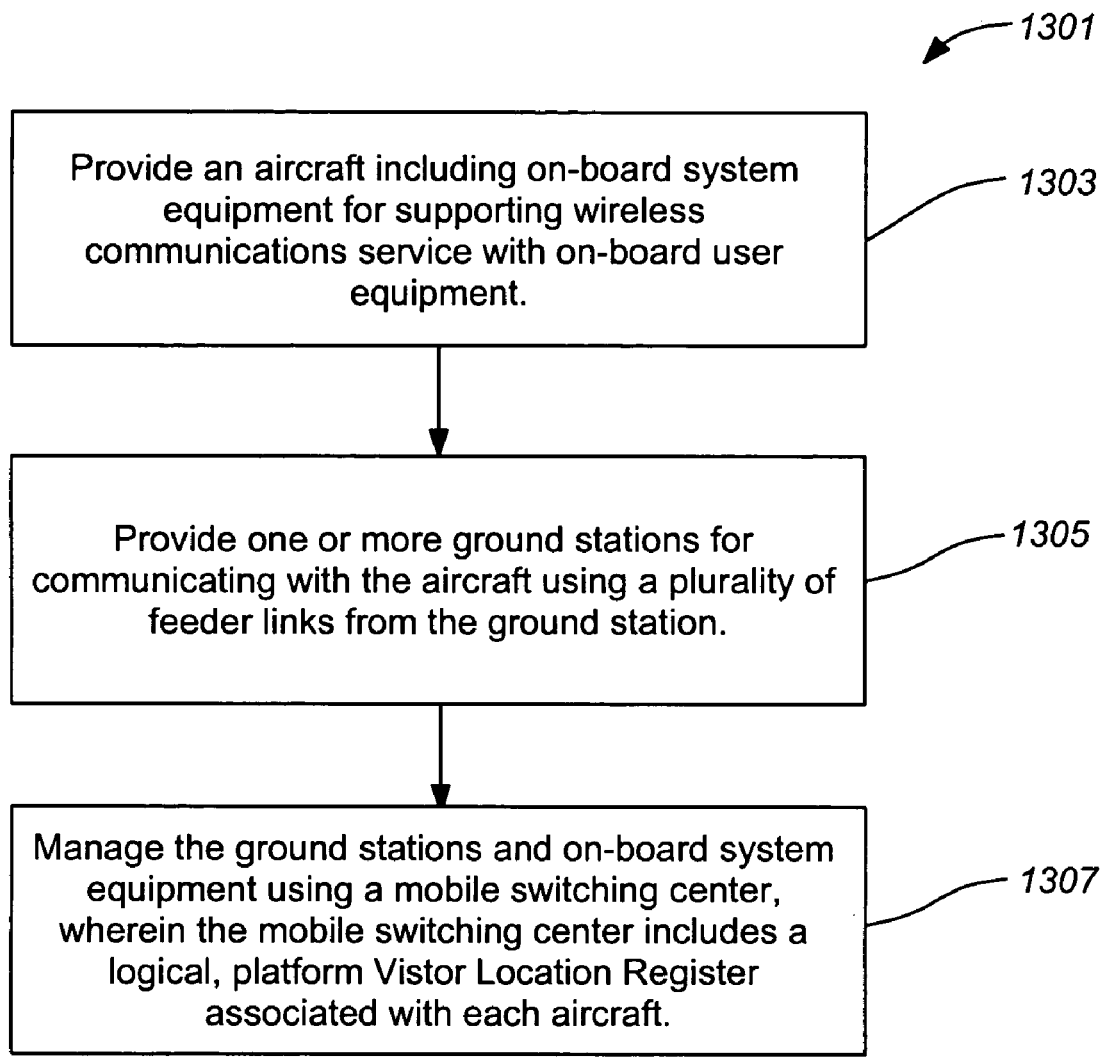
FIG. 13 is a flowchart of an exemplary method of the invention.

FIG. 13 illustrates and exemplary method 1301 of providing aircraft-based wireless communications service. At step 1303, an aircraft is provided including on-board equipment for supporting wireless communications service with user equipment on board the aircraft. At step 1305, one or more ground stations are provided for communicating with the aircraft using a plurality of feeder links from the ground stations, wherein the ground stations exchange the wireless communications service's traffic and control information with the system equipment on-board the aircraft, and provide interfaces with a terrestrial telecommunications infrastructure. At step 1307, a mobile switching center manages the ground stations and the on-board system equipment of the aircraft, wherein the mobile switching center includes at least one platform visitor location register (VLR) associated with each aircraft to ensure proper registration and tracking of the user equipment used on board the aircraft, wherein the platform VLR comprises a logical VLR. The user equipment used on board the aircraft is accounted for within the platform VLR, wherein the platform VLR contains information for each user equipment active on the aircraft at any time during the flight, and thus the platform VLR eliminates a requirement for switching or re-registering the user equipment with other registers. As a result, the platform VLR ensures having correct and timely knowledge of the user equipment's location used or activated during the aircraft's flight, in order to route calls to and from the user equipment on board the aircraft.

CONCLUSION

This concludes the description including the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto. The above specification, examples and data provide a complete description of the manufacture and use of the apparatus and method of the invention. Since many embodiments of the invention can be made without departing from the scope of the invention, the invention resides in the claims hereinafter appended.

What is claimed is:

1. A system for providing an aircraft-based wireless communications service, comprising:
   one or more aircraft each including on-board system equipment for supporting wireless communications service with on-board user equipment;
   one or more ground stations communicating with the aircraft using feeder links exchanging the wireless communications service's traffic and control information and providing interfaces with a terrestrial telecommunications infrastructure; and
   a mobile switching center that manages the ground stations and the on-board system equipment of the aircraft, wherein each aircraft has its own associated platform visitor location register (VLR) defined at the mobile switching center that identifies the user equipment on board that aircraft to ensure proper registration and tracking of the user equipment used an board the aircraft.

2. The system of claim 1, wherein the platform VLR associated with the aircraft comprises a logical VLR.

3. The system of claim 1, wherein the user equipment used on board the aircraft is accounted for within the platform VLR.

4. The system of claim 1, wherein the platform VLR contains information for each user equipment active on the aircraft at any time during the flight.

5. The system of claim 1, wherein the platform VLR eliminates a requirement for switching or re-registering the user equipment with other registers.

6. The system of claim 1, wherein the platform VLR ensures having correct and timely knowledge of the user equipment's location used or activated during the aircraft's flight, in order to route calls to and from the user equipment on board the aircraft.

7. The system of claim 1, wherein the mobile switching center includes at least one Home Location Register (HLR) that identifies local customers and at least one Visitor Location Register (VLR) that identifies roaming customers.

8. The system of claim 1, wherein the on-board system equipment comprises an Avionic Base Station Controller (ABSC), situated on board the aircraft, for providing Base Station Controller type functions that permit wireless communications from the aircraft.

9. The system of claim 8, wherein the Avionic Base Station Controller (ABSC) aggregates and manages communications between an on-board Avionic Base Transceiver Station (ABTS) and the mobile switching center.

10. The system of claim 1, wherein the on-board system equipment comprises an Avionic Base Transceiver Station (ABTS), situated on board the aircraft, for providing Base Transceiver Station (BSC) type functions that permit wireless communications from the aircraft.

11. The system of claim 10, wherein a terrestrial Base Station Controller (BSC) aggregates and manages communications between the on-board Avionic Base Transceiver Station (ABTS) and the mobile switching center.

12. A system for providing an aircraft-based wireless communications service, comprising:
at least one platform visitor location register (VLR) defined within a mobile switch center and associated with an aircraft having on-board system equipment for supporting wireless communications service with on-board user equipment, wherein the mobile switching center manages one or more ground stations communicating with the aircraft and exchanging the wireless communications service's traffic and control information with the on-board system equipment of the aircraft, and the platform VLR identifies the user equipment active on that aircraft to ensure proper registration and tracking of the user equipment used on board the aircraft.

13. A method of providing wireless communications service in an aircraft, comprising:
supporting the wireless communications service with user equipment on-board an aircraft using system equipment on board the aircraft;
communicating between the aircraft and one or more ground stations using a plurality of feeder links born the ground stations, wherein the ground stations exchange the wireless communication service's traffic and control information with the system equipment on-board the aircraft and provide interfaces with a terrestrial telecommunications infrastructure; and
managing the ground stations and the on-board system equipment of the aircraft using a mobile switching center, wherein each aircraft has its own associated platform visitor location register (VLR) defined at the mobile switching center that identifies the user equipment active on that aircraft to ensure proper registration and tracking of the user equipment used on board the aircraft.

14. The method of claim 13, wherein the platform VLR associated with the aircraft comprises a logical VLR.

15. The method of claim 13, wherein the user equipment used on board the aircraft is accounted for within the platform VLR.

16. The method of claim 13, wherein the platform VLR contains information for each user equipment active on the aircraft at any time during the flight.

17. The method of claim 13, wherein the platform VLR eliminates a requirement for switching or re-registering the user equipment with other registers.

18. The method of claim 13, wherein the platform VLR ensures having correct and timely knowledge of the user equipment's location used or activated during the aircraft's flight, in order to route calls to and from the user equipment on board the aircraft.

19. The method of claim 13, wherein the mobile switching center includes at least one Home Location Register (HLR) that identifies local customers and at least one Visitor Location Register (VLR) that identifies roaming customers.

20. The method of claim 13, wherein the on-board system equipment comprises an Avionic Base Station Controller (ABSC), situated on board the aircraft, for providing Base Station Controller type functions that permit wireless communications from the aircraft.

21. The method of claim 20, wherein the Avionic Base Station Controller (ABSC) aggregates and manages communications between an on-board Avionic Base Transceiver Station (ARTS) and the mobile switching center.

22. The method of claim 13, wherein the on-board system equipment comprises an Avionic Base Transceiver Station (ABTS), situated on board the aircraft, for providing Base Transceiver Station (BSC) type functions that permit wireless communications from the aircraft.

23. The method of claim 22, wherein a terrestrial Base Station Controller (BSC) aggregates and manages communications between the on-board Avionic Base Transceiver Station (ABTS) and the mobile switching center.

* * * * *